United States Patent [19]

Cothrell

[11] Patent Number: 5,259,282
[45] Date of Patent: Nov. 9, 1993

[54] METHOD AND DEVICE FOR CLEARING CUTOFF DEBRIS FROM A SAW

[75] Inventor: Leroy B. Cothrell, Gresham, Oreg.

[73] Assignee: Ultimizer's Inc., Boring, Oreg.

[21] Appl. No.: 915,243

[22] Filed: Jul. 20, 1992

Related U.S. Application Data

[63] Continuation-in-part of Ser. No. 792,610, Nov. 15, 1991, Pat. No. 5,181,445.

[51] Int. Cl.⁵ ............................................. B26D 7/18
[52] U.S. Cl. .................................... 83/99; 83/271; 83/424; 83/471.2; 83/477.2
[58] Field of Search ............... 83/99, 98, 22, 168, 83/100, 24, 477.2, 471.2, 271, 424

[56] References Cited

U.S. PATENT DOCUMENTS

| | | | |
|---|---|---|---|
| 478,511 | 7/1892 | Janssen | 83/98 X |
| 2,073,430 | 3/1937 | Tartz | 83/98 X |
| 2,107,174 | 2/1938 | Boice | 83/98 X |
| 2,116,123 | 5/1938 | Ocenasek | 83/98 X |
| 3,780,777 | 12/1973 | Davies | 83/371 X |
| 4,144,781 | 3/1979 | Kreitz | 83/100 |
| 4,813,319 | 3/1989 | Weyand, Jr. | 83/22 |

Primary Examiner—Richard K. Seidel
Assistant Examiner—Kenneth E. Peterson
Attorney, Agent, or Firm—Kolisch, Hartwell, Dickinson, McCormack & Heuser

[57] ABSTRACT

An improved wood debris clearing device and method for a cutoff saw is provided. The device includes a conveyor having upstream and downstream sections separated by a gap where cutting occurs along a conveyance path. A deflecting mechanism including two blowers, perpendicularly oriented with respect to the conveyance path, direct air streams across the conveyance path. Cutoff wood debris is deflected off an inner wall of a hood into a receptacle, thus preventing the debris from reaching the downstream section of the conveyor and minimizing the likelihood of machine jamming.

9 Claims, 2 Drawing Sheets

METHOD AND DEVICE FOR CLEARING CUTOFF DEBRIS FROM A SAW

This application is a continuation-in-part of U.S. application Ser. No. 07/792,610, now U.S. Pat. No. 5,181,445.

BACKGROUND OF THE INVENTION

The present invention relates to cutoff saws. In particular, the invention involves an improved device and method for clearing away cutoff debris in the cutting vicinity of a cutoff saw, thereby minimizing machine jamming and allowing faster throughput. The invention allows cutoff debris to be cleared immediately after cutting, even prior to the blade returning to its non-cutting position, thus preventing the debris from falling into the saw blade slot. The invention is useful, for example, in a cutoff saw such as the one disclosed and claimed in co-pending U.S. patent application Ser. No. 07/792,610, now U.S. Pat. No. 5,181,445, which is hereby incorporated by reference.

The yield obtainable for a given cutoff saw directly depends on how fast the saw is capable of running. One significant limitation on a saw's running speed is its ability to clear cutoff debris from the conveyance path. Cutoff debris typically includes wood pieces varying in size from small wood dust particles to relatively large excised board sections. As the saw's running speed is increased, the tendency for cutoff debris to jam the machine increases. When jamming occurs, the machine must be stopped, thus negating the goal of increasing yield, i.e., board throughput.

Another problem caused by wood debris in the conveyance path is that it can adversely affect cutting accuracy. Wood debris which remains on the conveyor or which becomes lodged in the vicinity of the saw blade may displace the object board causing deviations from the desired cutting line.

Prior attempts to solve the problems discussed above have proven unsatisfactory. For example, prior cutoff saws have included mechanisms for clearing cutoff debris from the downstream conveyor. This approach is flawed because by the time the debris reaches the downstream conveyor it is often too late to avoid jamming. Others have tried to employ a vacuum mechanism for removing cutoff debris downstream from the saw blade. This approach is also quite limited because, although it may be capable of removing fine particles such as wood dust, it is not satisfactory for removing larger cutoff debris such as knots or excised board sections which are the primary causes of machine jamming.

SUMMARY OF THE INVENTION

An object of the present invention is to provide a device and method which solves the problems discussed above, namely, providing a cutoff saw mechanism and method for clearing cutoff saw debris of variable sizes in a manner which is less susceptible to jamming compared to prior debris-clearing mechanisms, and which allows greater board throughput and cutting accuracy.

Another object of the invention is to provide a mechanism and method for clearing the cutoff saw debris after cutting, but prior to reaching a downstream conveyor.

Another object of the invention is to provide a device and method for clearing cutoff waste immediately after cutting, prior to the blade returning to its non-cutting position, thus preventing the waste from falling into the saw blade slot.

Another object of the invention is to provide a device and method for collecting cutoff saw debris after the debris has been cleared from the saw's conveyance path.

In brief summary, the invention includes a conveyor having upstream and downstream sections separated by a gap along a conveyance path. A saw blade is movable in the conveyor gap in a plane which is substantially perpendicular to the conveyance path for cutting the board at a pre-selected line along the board as it translates between the upstream and downstream sections of the conveyor. A deflecting mechanism is positioned near the conveyor gap and is capable of clearing cutoff debris from the conveyance path and preventing translation of the debris onto the downstream section of the conveyor. A preferred embodiment of the invention includes a first blower upstream from the saw blade and a second blower downstream from the saw blade, both blowers being directed perpendicularly across the conveyance path in the gap between the upstream and downstream sections of the conveyor.

In operation, boards are marked for cutting and transported down the conveyor toward the saw blade in the gap between the upstream and downstream sections of the conveyor. Cuts are made in the board for the purpose of producing desired board lengths and for the purpose of removing flawed or otherwise unusable board sections. Pulsed air streams are projected out of the first and second blowers across the conveyance path to urge the debris or waste materials toward an inner hood surface where the wood pieces are deflected into a waste receptacle.

DETAILED DESCRIPTION OF THE PREFERRED EMBODIMENTS

The present invention is useful in a saw of the type described in my co-pending U.S. patent application Ser. No. 07/792,610. Details of the invention will now be explained with reference to FIGS. 1—4.

Figure 1:
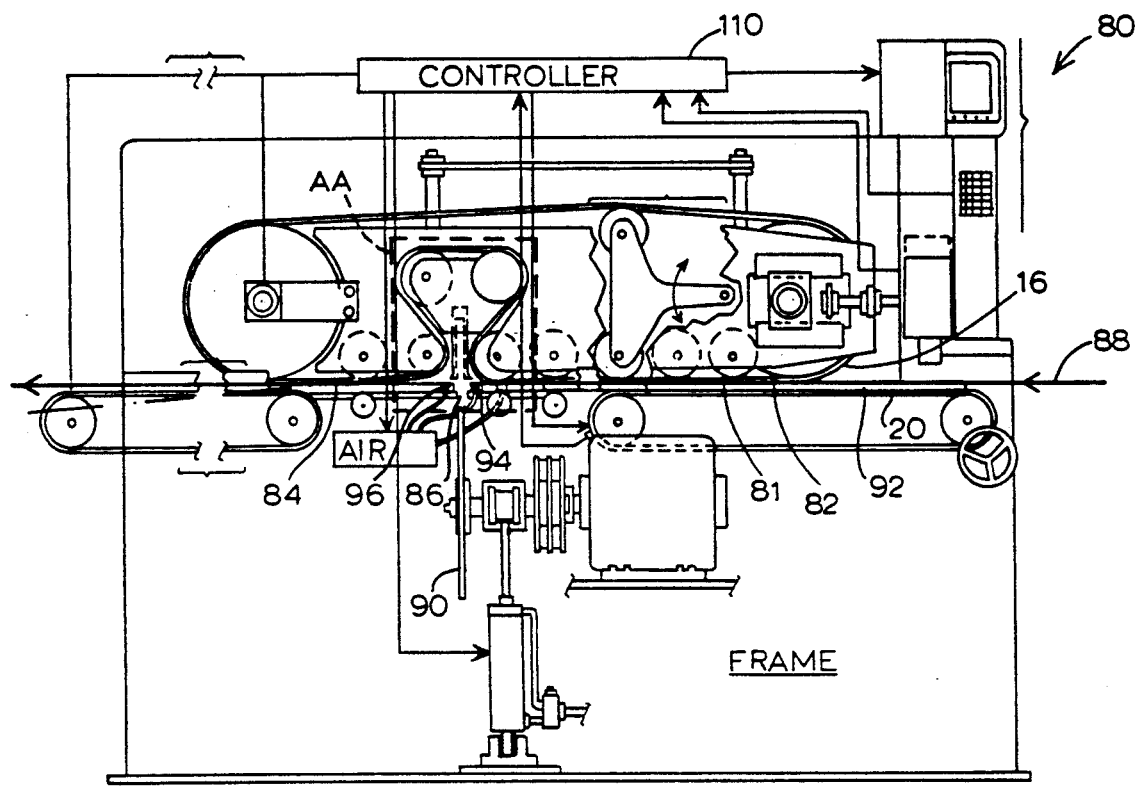
FIG. 1 is a front elevation view showing the cutoff saw made in accordance with a preferred embodiment of the present invention.

As shown in FIG. 1, the cutoff saw 80 has a conveyor 81 including an upstream section 82 and a downstream section 84 separated by a gap 86 along a conveyance path 88. A saw blade 90 is movable in the conveyor gap 86 in a plane which is substantially perpendicular to the conveyance path 88 and is capable of cutting the board 92 at a pre-selected line along the board 92 as it translates between the upstream and downstream sections of the conveyor 81.

A mechanism near the conveyor gap 86 is capable of clearing cutoff debris from the conveyance path 88 and preventing translation of the debris onto the downstream section 84 of the conveyor 80. In a preferred embodiment, the deflecting mechanism, which is more clearly shown in FIGS. 2, 3A and 3B, includes a first blower 94 disposed upstream from the saw blade 90, and a second blower 96 disposed downstream from the saw blade 90, each of which is capable of projecting an air stream across the conveyance path 88 in the vicinity of the conveyor gap 86. Blowers 94 and 96 are preferably directed perpendicularly across the conveyance path 88 in the gap 86 between the upstream and downstream sections of the conveyor 80. Although small alterations in the blowers' angles or locations may be employed for particular purposes, generally the best results have been obtained by positioning a pair of alternately pulsed blowers 94 and 96 on opposite sides of the cutting blade plane, directed parallel to each other, and perpendicularly across the conveyance path 88.

Figure 3A:
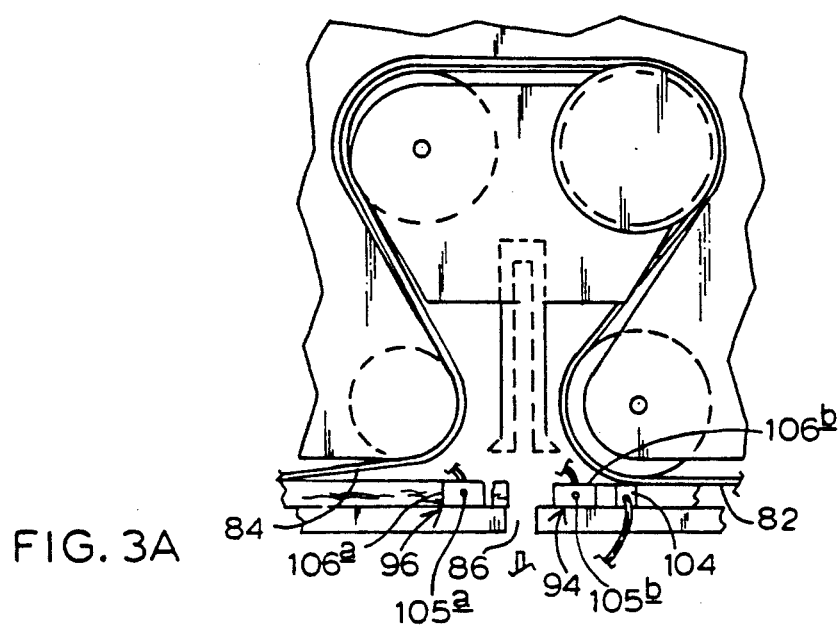
FIG. 3A is an enlarged fragmentary view of the cutoff saw shown in FIG. 1.
Figure 3B:
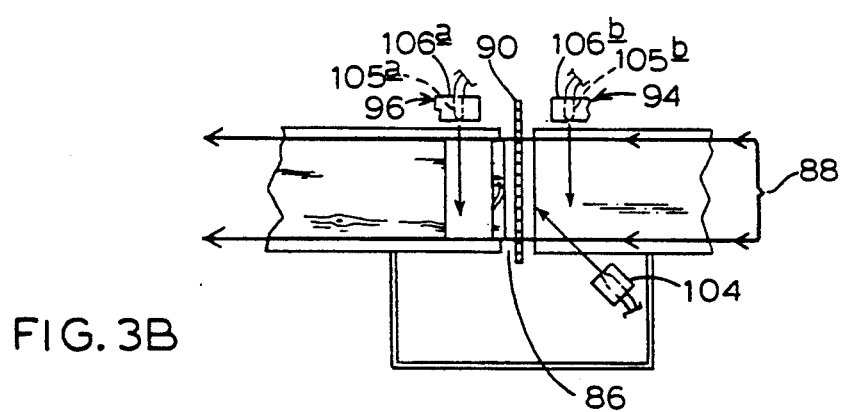
FIG. 3B is a top plan view of the fragmentary view shown in FIG. 3A.

A third blower 104 may be positioned on the side of the conveyance path which is opposite from blowers 94 and 96, and obliquely directed toward the conveyance path 88, as shown in FIGS. 3A and 3B, upstream from the saw blade 90 into the gap 86. The third blower is oriented at an angle between 30 degrees and 60 degrees, preferably 45 degrees, relative to the conveyance path 88. The primary purpose of the third blower is to clear wood dust from the board's upper surface so that pre-selected cutting marks and/or board edges can be clearly detected by the saw's photosensitive detector subsystem (which is conventional and forms no part of the present invention) allowing accurate cutting. Although the third blower may be connected to the same air source as the other blowers, and may even be synchronized with one of the other blowers such as upstream blower 94, the third blower has little if any effect on the debris-clearing function of the first and second blowers.

A variety of different types of structures can be used as "blowers" in the claimed invention. For example, as shown in FIGS. 3A and 3B, blowers 94 and 96 may be created by boring holes 105a and 105b in the sides of upstream and downstream rails 106a and 106b respectively, which flank the conveyance path 88 in the cutting vicinity. Alternatively, a nozzle type blower may be used; or a piece of pipe can also be used as a blower.

Figure 4:
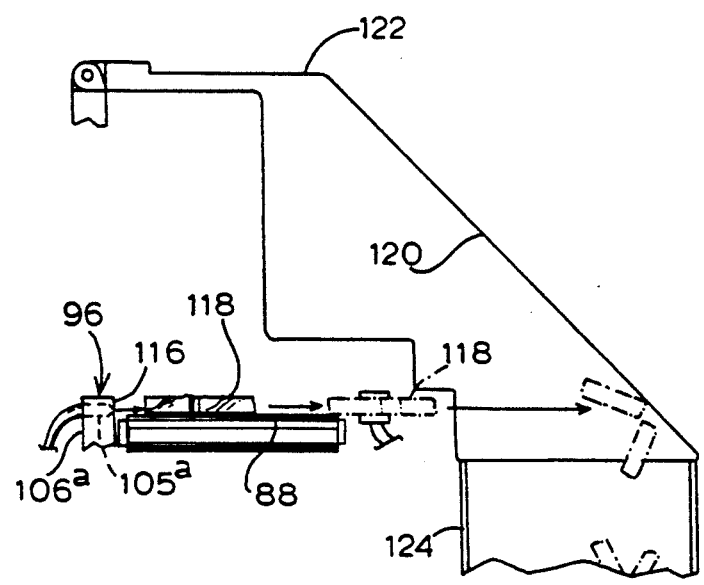
FIG. 4 is an enlarged fragmentary side elevation view of the cutoff saw shown in FIG. 1.

The direction and intensity of the air stream projected from a given blower can be modified by altering the tip of the blower. For example, if a "pipe" blower is used, the air speed can be increased by constricting the pipe's inner diameter near the tip. In a preferred embodiment, as shown in FIG. 3B and FIG. 4, the blower hole 105a is constricted from a ½ inch diameter at the air-entry end of the hole to a ¼ inch diameter near the air-exit end of the hole.

It may also be advantageous to provide adjustable blowers. For example, air stream intensity may be made adjustable by employing a twist-adjustable nozzle mechanism analogous to a shower nozzle. The air stream direction may also be adjustable by employing a bendable pipe or a pivotable nozzle near the blower's tip.

Figure 2:
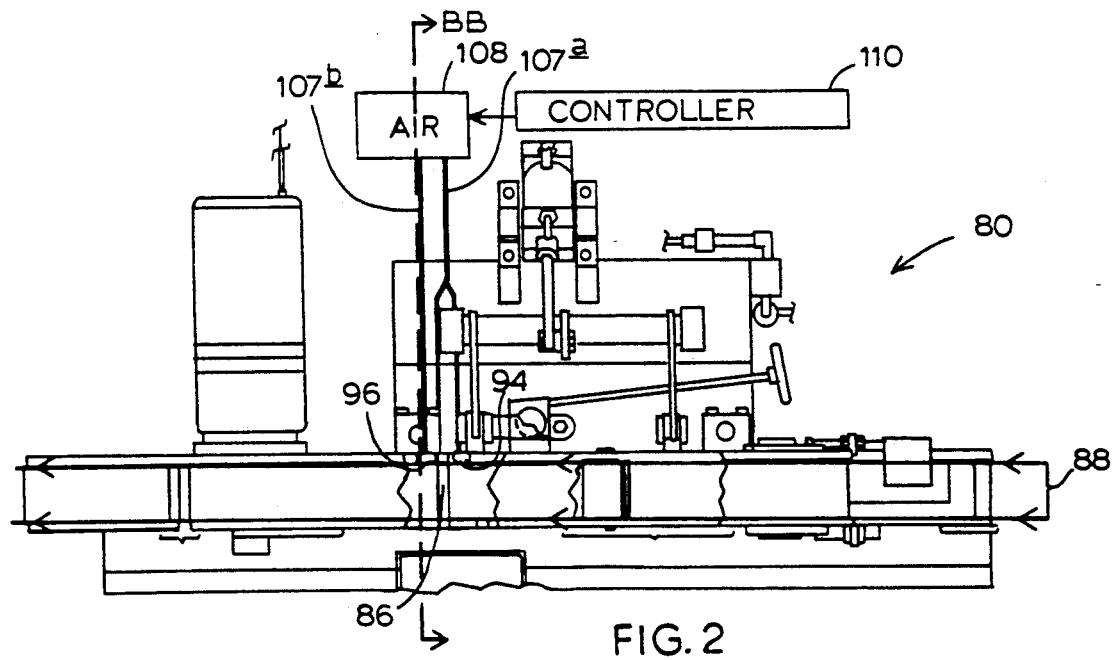
FIG. 2 is a top plan view of the cutoff saw shown in FIG. 1.

As shown in FIG. 2, blowers 96, 94 and 104 are connected via conduits 107a and 107b to a compressed air source 108. A controller 110 is connected to the compressed air source 108 and operates in combination with the air source to produce pulsed air streams through the blowers 94, 96 and 104. Sections of the board which are to be removed ("waste sections") are marked. The controller monitors the running speed of the saw and confirms through an electro-optical sensor that the placement of the cutting mark is in line with the saw blade. If an internal waste section is being cut, two cuts are required to excise the section. The controller senses when the second cut has been made and causes the downstream blower 96 to pulse, thus projecting the waste section out of the conveyance path. Only a single cut is required to cut a waste section from an end of the board. If a waste section is cut from the leading end of the board, downstream blower 96 pulses after the first cut, thereby projecting the section out of the conveyance path. If the waste section is cut from the trailing end of the board, upstream blower 94 pulses after the last cut has been made, thereby projecting the section out of the conveyance path. The coordination of blower operation with pre-determined waste section marking, cutting and removal is all flexibly and accurately controlled by the controller 110.

The blowers 94 and 96 should project air with sufficient force efficiently to clear small board sections from the conveyance path immediately after cutting, prior to the blade returning to its non-cutting position, thus preventing the waste sections from falling into the saw blade slot. However, the blower air pressure should not be so great as to cause displacement of the board prior to cutting or to cause compressed air waste. It has been found that these competing objectives can be successfully realized with a blower pressure of between approximately 80 and 120 pounds per square inch. However, it should be noted that this parameter is referenced to the saw of FIG. 1, which is described in more detail in referenced U.S. patent application Ser. No. 07/792,610, and employs opposing infeed conveyors 16 and 20 which grip the board 92, thus resisting the force of cross-path air streams projected from blowers 94 and 96 prior to cutting. In older more conventional cut-off saws which do not employ such a gripping means, it may be necessary to restrict the timing and intensity of blower air flow, so as to minimize pre-cutting board displacement from the conveyance path.

FIG. 4 shows a cross section taken through the plane 4—4 of the saw illustrated in FIG. 2. Blower 94 is produced by boring a hole 105a (shown in dashed lines) in a rail 106a on the inner side 116 of the conveyance path 88 (perpendicular to the plane of the drawing). An excised section 118 of the board 92 is blown from the conveyance path and deflected off of an inner wall 120 of a deflecting hood 122 into a receptacle 124. The hood 122 is also provided with side walls 124 for preventing debris from projecting from under the hood and creating a potential risk of injury to an operator.

The wood debris-clearing mechanism described above has made it possible to significantly increase the running speed of a conventional cutoff saw while avoiding jamming and down time. The invention also provides efficient and automatic collection of the substantial quantity of wood debris which is typically produced from a rapidly running cutoff saw.

The claims below are not intended to be limited to the specific details of the preferred embodiments described above. Various modifications can be made without departing from the spirit and scope of the claimed invention.

I claim:
1. A saw for cutting a board comprising:
   a conveyor including an upstream section and a downstream section separated by a gap along a conveyance path;
   a saw blade moveable in the conveyor gap in a plane substantially perpendicular to the conveyance path for cutting the board at a pre-selected line along the board as it translates between the upstream and downstream sections of the conveyor;

a saw board deflecting mechanism including at least a first blower aimed to blow an air stream horizontally, at board level, perpendicular to the conveyance path near the conveyor gap, whereby the deflecting mechanism has sufficient power to remove scrap board from the conveyance path; and a second blower aimed to blow an airstream horizontally, at board level, perpendicular to the conveyance path near the conveyor gap, wherein the first blower is positioned upstream from the saw blade and the second blower is positioned downstream from the saw blade.

2. The saw of claim 1 further comprising a deflecting hood opposing the blower for deflecting cleared wood debris into a receptacle.

3. The saw of claim 1 further comprising a controller, wherein the controller intermittently activates the first blower to project an air stream immediately after cutting and deactivates the first blower to refrain from projecting an air stream while the saw is cutting the board.

4. The saw of claim 1 wherein the blowers are connected to an air source operable in combination with a controller to drive intermittent pulsed air streams through the blowers.

5. The saw of claim 4 wherein the air source is operable to produce between approximately 80 and 120 pounds per square inch pressure through the blowers.

6. The saw of claim 1 further comprising a third blower obliquely directed toward the conveyance path upstream from the saw blade into the gap between the upstream and downstream sections of the conveyor, the third blower being operable to project an air stream synchronously with the first blower.

7. The saw of claim 6 wherein the direction of the third blower forms an angle with the conveyance path of between thirty and sixty degrees.

8. The saw of claim 6 wherein the third blower is aimed at approximately a forty-five degree angle to the conveyance path.

9. The saw of claim 1 wherein the blower includes a tube having a constricted inner diameter near an opening for increasing air velocity.

* * * * *